O. R. KIRKPATRICK.
TROLLEY POLE.
APPLICATION FILED AUG. 26, 1915.
1,191,796.
Patented July 18, 1916.
2 SHEETS—SHEET 1.
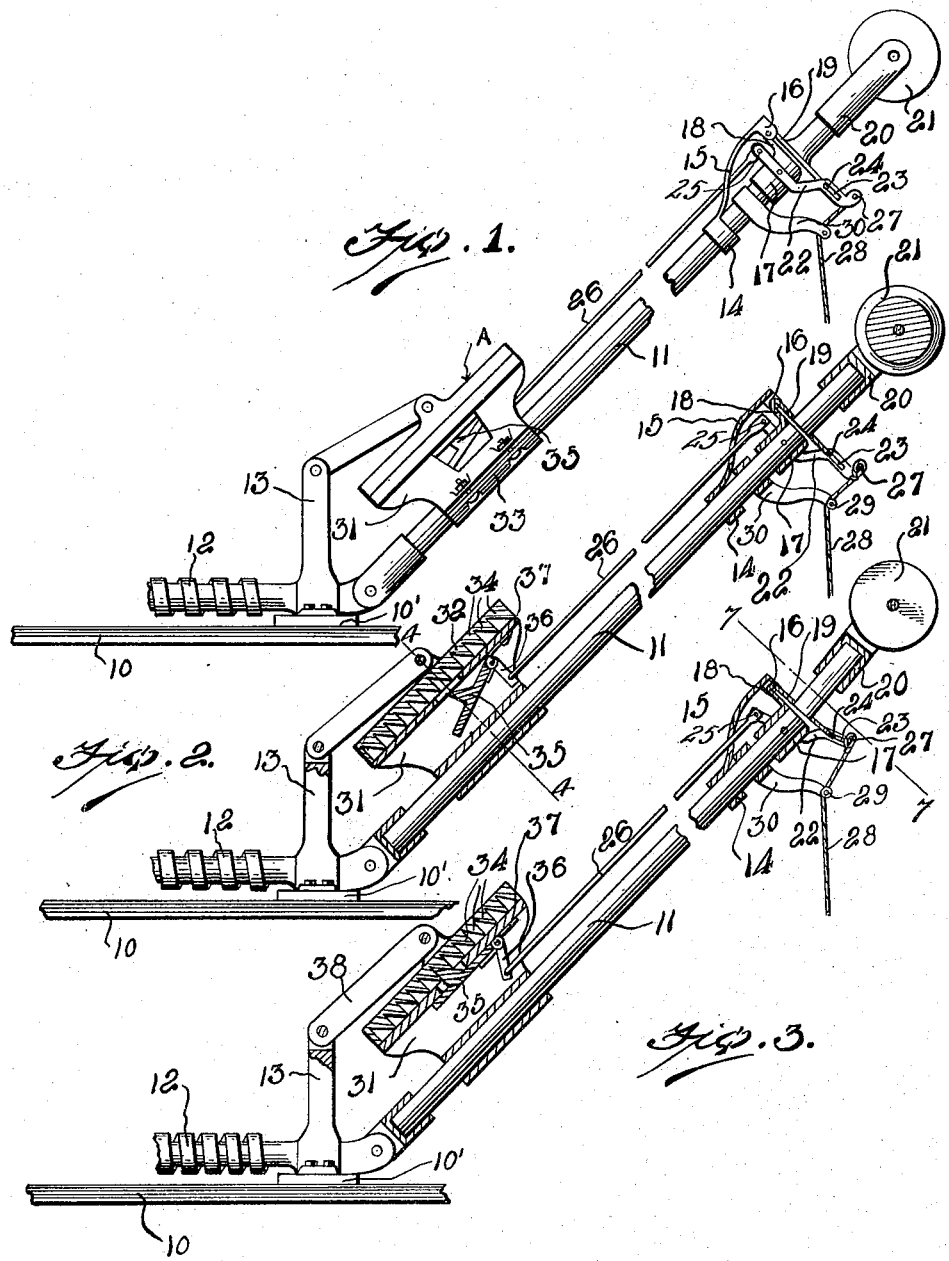

O. R. KIRKPATRICK.
TROLLEY POLE.
APPLICATION FILED AUG. 26, 1915.
1,191,796.
Patented July 18, 1916.
2 SHEETS—SHEET 2.
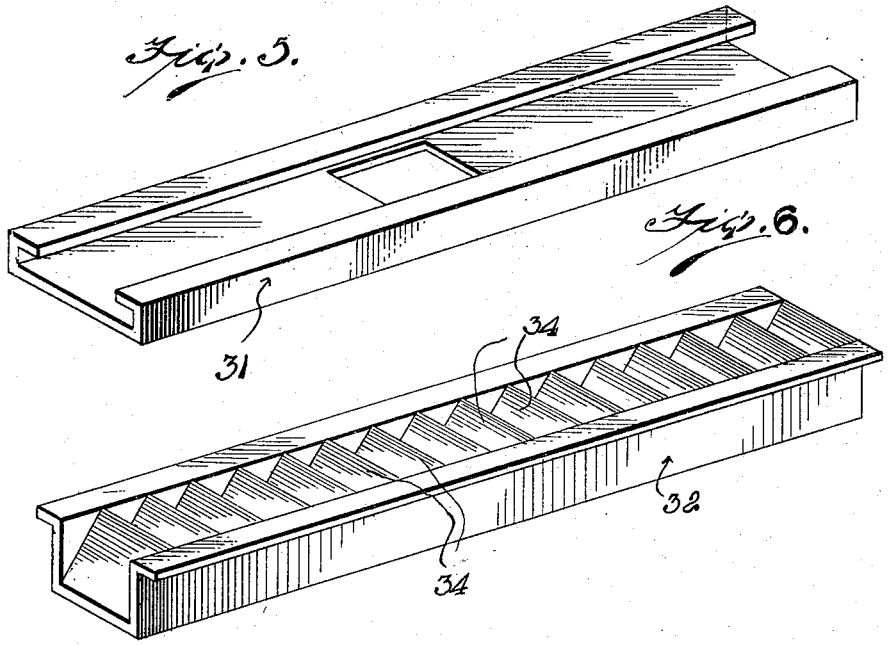
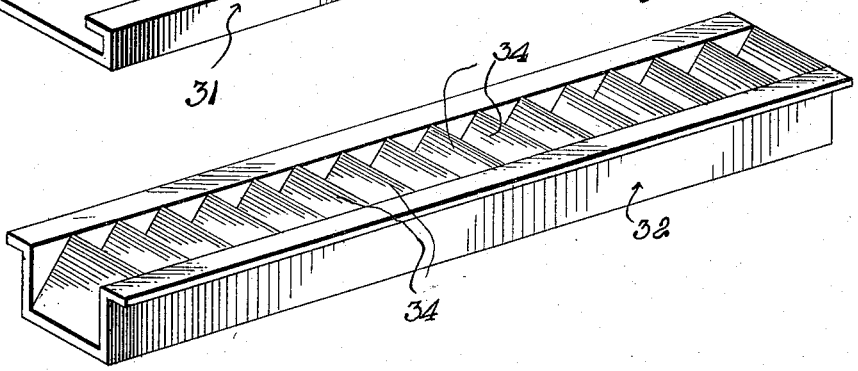
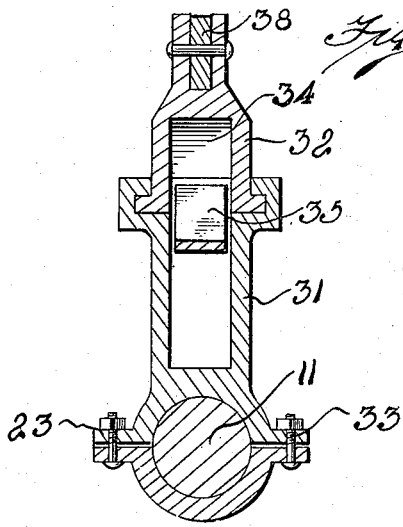
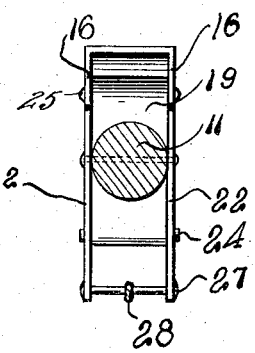

UNITED STATES PATENT OFFICE.

OTEY R. KIRKPATRICK, OF FORT WORTH, TEXAS.

TROLLEY-POLE.

1,191,796.    Specification of Letters Patent.    Patented July 18, 1916.

Application filed August 26, 1915. Serial No. 47,496.

*To all whom it may concern:*

Be it known that I, OTEY R. KIRKPATRICK, a citizen of the United States, residing at Fort Worth, in the county of Tarrant, State of Texas, have invented certain new and useful Improvements in Trolley-Poles; and I do hereby declare the following to be a full, clear, and exact description of the invention, such as will enable others skilled in the art to which it appertains to make and use the same.

This invention relates to trolley poles.

The object of the invention is to provide a trolley pole embodying an improved construction whereby the pole, when the trolley has accidentally left the wire, is prevented from flying up and doing damage to the guard wire, to itself, or to anything with which it comes in contact.

A further object of the invention is to provide a trolley of the type named which will be simple in construction, and reliable and efficient in use.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side elevation of a trolley pole embodying the invention; Figure 2, a longitudinal section of what is shown in Fig. 1 with the parts in the position they would occupy when the trolley wheel is properly engaged with the trolley wire; Fig. 3, a view similar to Fig. 2 with the parts in the position they would occupy when the trolley wheel has become disengaged from the trolley wire; Fig. 4, a section on the line 4—4 of Fig. 1; Fig. 5, a perspective view looking at the inner side of one of the members of the locking device; Fig. 6, a perspective view looking at the inner side of the other member of the locking device, and Fig. 7, a section on the line 7—7 of Fig. 1.

Referring to the drawings 10 indicates the top of a car upon which is mounted a base 10′ having pivoted thereto a trolley pole 11 which is normally urged upwardly at its free end by a spring 12 in the usual and well known manner. Rising from the base 10 is an upright 13 for a purpose that will presently appear. Mounted upon the trolley pole 11 is a collar 14 and extending from this collar toward the free end of the pole 11 is an arm 15 the outer end of which terminates in spaced ears 16. Mounted on the free end of the pole 11 is a head 17 having a lateral extension 18 secured between the ears 16. Connected to the extension 18 in a pivotal manner between the ears 16 is an arm 19 to the free end of which is secured a harp 20 and rotatably mounted in this harp is a trolley wheel 21. Pivotally mounted on opposite sides of the head 17 are corresponding arms 22. One end of these arms is provided with elongated slots 23 in which are slidably engaged respectively projections 24 on the base of the arm 19. The other end of the arms 22 is connected by a rod 25 to which is pivotally secured one end of a link 26. The ends of the arm 22 remote from the rod 25 are connected by a rod 27 to which is secured one end of a trolley rope 28, said rope being trained over a pulley 29 carried by a bracket 30 on the pole 11 although it will be understood that this pulley may be dispensed with under certain conditions and is in no way essential to the invention.

Mounted upon the pole 11 is a clutch or locking member A which includes sections 31 and 32 and a clamping segment 33. The sections 31 and 32 are connected together by a tongue and groove and the latter is provided on its inner face with a series of ratchet teeth 34, it being noted that the sections 31 and 32 are slidably connected together for relative longitudinal movement. Pivotally mounted in the member 31 is a pawl 35 adapted for coöperation with the ratchet teeth 34. The inner end of the pawl 35 carries an angularly disposed arm 36 the free end of which is pivotally connected to the link 26. A spring 37 is mounted in the member 31 and constantly tends to force the pawl 35 into engagement with the ratchet teeth 34.

When the parts are in the position shown in Figs. 1 and 2 or in other words when the trolley wheel 21 is properly engaged with the trolley wire the pawl 35 will be held out of engagement with the teeth 34 against the influence of the spring 37 and the trolley pole will be free to move up and down to permit the trolley wheel 21 to correctly follow the trolley wire. It will be noted that the member 32 is connected to the upright 13 by a link 38 whereby proper relative sliding movement between the sections 31 and 32 will be had under normal conditions. As soon as the trolley wheel 21 becomes disengaged from the trolley wire the pawl 35 will be released to the influence of the spring 37 and moved into engagement with the tooth 34 when the pole 11 will be locked against pivotal movement in one direction under the influence of the spring 12.

What is claimed is: —

1. The combination with a base, a vertically swinging trolley pole mounted on the base, and spring means constantly urging the pole in one direction, of a head pivoted on the free end of said pole, a member fixed on the pole, a second member slidably connected to the first member, connections between the second member and the base whereby the movement of the pole will slide the second member relatively to the first member, ratchet teeth on one of said members, a pawl pivoted on the other member for coöperation with said teeth, spring means constantly tending to engage the pawl with the teeth to lock the second member against sliding movement under the influence of the upward movement of the pole, and connections between the pawl and the pivoted head adapted to hold the pawl out of engagement with the teeth when said head is in normal position and to engage said pawl with the teeth when pivotal movement in one direction is imparted to the head.

2. The combination with a base, a vertically swinging trolley pole mounted on the base, and spring means constantly urging the pole in one direction, of a head pivoted on the free end of said pole, a trolley wheel journaled on said head, arms pivoted on opposite sides of the pole at the free end of the latter, a sliding connection between the head and corresponding ends of said arms, a link pivotally connected to the other ends of said arms, a member fixed on the pole, a second member slidably connected to the first member, connections between the second member and the base whereby the movement of the poles will slide the second member relatively to the first member, ratchet teeth on one of said members, a pawl pivoted on the other member for coöperation with the teeth, spring means constantly tending to engage the pawl with the teeth to lock the second member against sliding movement under the influence of the upward movement of the pole, and an arm on said pawl having its free end pivotally connected to said link whereby said pawl will be held out of engagement with the teeth when the pivoted head on the free end of the pole is in its normal position.

In testimony whereof, I affix my signature, in the presence of two witnesses.

OTEY R. KIRKPATRICK.

Witnesses:
O. O. ZANCE,
S. M. HORN.

Copies of this patent may be obtained for five cents each, by addressing the "Commissioner of Patents, Washington, D. C."